(12) United States Patent
Sun

(10) Patent No.: US 12,389,316 B2
(45) Date of Patent: Aug. 12, 2025

(54) COMMUNICATION PROCESSING METHOD, BBU, RHUB, AND SECOND PRRU

(71) Applicant: HUAWEI TECHNOLOGIES CO., LTD., Guangdong (CN)

(72) Inventor: Qiang Sun, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 17/726,656

(22) Filed: Apr. 22, 2022

(65) Prior Publication Data

US 2022/0248323 A1 Aug. 4, 2022

Related U.S. Application Data

(63) Continuation of application No. PCT/CN2020/123059, filed on Oct. 23, 2020.

(30) Foreign Application Priority Data

Oct. 24, 2019 (CN) .......................... 201911018505.X

(51) Int. Cl.
*H04W 48/20* (2009.01)
*H04W 24/10* (2009.01)
(Continued)

(52) U.S. Cl.
CPC ........... *H04W 48/20* (2013.01); *H04W 24/10* (2013.01); *H04W 88/085* (2013.01); *H04W 92/10* (2013.01)

(58) Field of Classification Search
CPC ..... H04W 48/20; H04W 24/10; H04W 92/10; H04W 88/085; H04W 40/12; H04W 40/02
See application file for complete search history.

(56) References Cited

U.S. PATENT DOCUMENTS

| 9,392,635 B2 | 7/2016 | Hahn et al. |
| 2012/0147766 A1* | 6/2012 | Kim ...................... H04W 24/10 370/252 |

(Continued)

FOREIGN PATENT DOCUMENTS

| CN | 101150348 A | 3/2008 |
| CN | 103222299 A | 7/2013 |

(Continued)

OTHER PUBLICATIONS

Extended European Search Report issued in EP20879836.3, dated Oct. 20, 2022, 15 pages.

(Continued)

*Primary Examiner* — Shah M Rahman

(57) ABSTRACT

Embodiments of this application disclose a communication processing method. The method includes: a baseband processing unit (BBU) receives an uplink measurement signal sent by a first terminal device. The BBU generates an air interface measurement report based on the uplink measurement signal, where the air interface measurement report includes an air interface channel quality value between the first terminal device and at least one pico remote radio unit (pRRU) in a cell in which the first terminal device is located. The BBU selects a target pRRU from the at least one pRRU based on the air interface measurement report, where a quantity of target pRRUs is less than a quantity of the at least one pRRU. The target pRRU is configured to send a downlink signal of the first terminal device to the first terminal device.

12 Claims, 11 Drawing Sheets

(51) Int. Cl.
*H04W 88/08* (2009.01)
*H04W 92/10* (2009.01)

(56) References Cited

U.S. PATENT DOCUMENTS

| | | | | |
|---|---|---|---|---|
| 2012/0178468 A1* | 7/2012 | Jeong | ............... | H04W 36/324 455/452.1 |
| 2012/0202548 A1* | 8/2012 | Lee | ............... | H04B 7/0408 342/372 |
| 2013/0029711 A1* | 1/2013 | Kang | ............... | H04B 7/0691 455/517 |
| 2015/0223085 A1* | 8/2015 | Siomina | ............ | H04W 52/0229 370/252 |
| 2017/0048726 A1* | 2/2017 | Zhang | ............... | H04W 88/08 |
| 2017/0180090 A1* | 6/2017 | Park | ............... | H04W 28/16 |
| 2018/0077595 A1* | 3/2018 | Park | ............... | H04L 5/0055 |
| 2018/0103377 A1* | 4/2018 | Schmidt | ............ | H04W 16/02 |
| 2018/0206144 A1* | 7/2018 | Jiang | ............... | G01S 5/02213 |
| 2018/0332617 A1* | 11/2018 | Zeng | ............... | H04W 72/0453 |
| 2019/0116568 A1* | 4/2019 | Fertonani | ............ | H04W 56/00 |
| 2020/0059828 A1* | 2/2020 | Yu | ............... | H04B 7/061 |
| 2020/0235788 A1* | 7/2020 | Rajagopal | ............ | H04B 7/0848 |

FOREIGN PATENT DOCUMENTS

| | | | | |
|---|---|---|---|---|
| CN | 103491638 | A | | 1/2014 |
| CN | 105265015 | A | | 1/2016 |
| CN | 106330279 | A * | 1/2017 | ........... H04B 7/0413 |
| CN | 106685508 | A | | 5/2017 |
| CN | 107211480 | A | | 9/2017 |
| CN | 111245486 | A * | 6/2020 | ............... H04B 3/32 |
| EP | 3148279 | A1 | | 3/2017 |
| EP | 3397016 | A1 | | 10/2018 |
| EP | 3531565 | A1 | | 8/2019 |
| WO | 2009036636 | A1 | | 3/2009 |
| WO | 2014046581 | A1 | | 3/2014 |
| WO | 2015103772 | A1 | | 7/2015 |
| WO | WO-2018094746 | A1 * | 5/2018 | ........... H04W 16/10 |
| WO | WO-2018098763 | A1 * | 6/2018 | ........... H04W 52/02 |
| WO | 2018227346 | A1 | | 12/2018 |

OTHER PUBLICATIONS

Office Action issued in CN201911018505.X, dated Dec. 21, 2021, 7 pages.
International Search Report and Written Opinion issued in PCT/CN2020/123059, dated Jan. 13, 2021, 9 pages.

* cited by examiner

COMMUNICATION PROCESSING METHOD, BBU, RHUB, AND SECOND PRRU

CROSS-REFERENCE TO RELATED APPLICATIONS

This application is a continuation of International Application No. PCT/CN2020/123059, filed on Oct. 23, 2020, which claims priority to Chinese Patent Application No. 201911018505.X, filed on Oct. 24, 2019. The disclosures of the aforementioned applications are hereby incorporated by reference in their entireties.

TECHNICAL FIELD

This application relates to communication technologies, and in particular, to a communication processing method, a BBU, an RHUB, and a second pRRU.

BACKGROUND

With development of communication technologies, indoor areas have become mobile service area with high incidence. Currently, indoor signal coverage is mainly implemented by using an indoor distribution system, and signals of a base station are evenly distributed to each indoor corner by using various indoor antennas.

Currently, the indoor distribution system mainly includes a new digital indoor system (DIS) and a conventional distributed antenna system (DAS). However, as shown in FIG. 1A, the DIS is an architecture divided into three levels: a baseband processing unit (base band unit, BBU), a remote radio unit hub (RHUB), and pico remote radio units (pRRU). One BBU may be connected to one or more RHUBs (FIG. 1A only shows a scenario in which the BBU is connected to one RHUB), and one RHUB may be connected to a plurality of pRRUs. An operating principle of the DIS is: The BBU sends downlink signals to the RHUB. The RHUB is connected to the pRRU through one network cable. The RHUB delivers the downlink signals to the pRRUs. The pRRUs process the downlink signals into radio frequency signals, and make the radio frequency signals access an indoor area through a transmission device such as a radio frequency feeder, a combiner/divider, or an antenna. An indoor terminal sends feedback signals to the pRRUs, and the pRRUs send the feedback signals to the RHUB. The RHUB converges the feedback signals, and then sends the feedback signals to the BBU.

However, in this system, the downlink signals of the terminal device that are transmitted by the plurality of pRRUs are the same. Because the pRRUs are installed at different positions, a latency occurs when the same downlink signals arrive at the terminal device through the different pRRUs. A larger latency indicates a smaller coherence bandwidth of the signals. When a signal bandwidth occupied by the terminal device is greater than the coherence bandwidth, frequency selective fading occurs. Consequently, signal distortion occurs in a frequency band occupied by the signals, downlink channel transmission quality is affected, and downlink transmission performance is reduced.

SUMMARY

Embodiments of this application provide a communication processing method, a BBU, an RHUB, and a second pRRU, which are used to reduce a probability of frequency selective fading of a signal and improve downlink transmission performance.

A first aspect of embodiments of this application provides a communication processing method. The method includes:

A BBU receives an uplink measurement signal sent by a first terminal device. Then the BBU generates an air interface measurement report based on the uplink measurement signal. The air interface measurement report includes an air interface channel quality value between the first terminal device and at least one pRRU in a cell in which the first terminal device is located. The BBU selects a target pRRU from the at least one pRRU based on the air interface measurement report. The target pRRU is configured to send a downlink signal of the first terminal device to the first terminal device, and a quantity of target pRRUs is less than a quantity of the at least one pRRU. Therefore, in the technical solution in this embodiment of this application, the BBU selects the target pRRU from the at least one pRRU based on the air interface measurement report to send the downlink signal to the first terminal device. Compared with a conventional technology, this embodiment of this application reduces a path for sending the downlink signal of the first terminal device, so that a transmission latency is reduced, a probability of frequency selective fading of a signal is reduced, and downlink transmission performance is improved.

In a possible implementation, the at least one pRRU includes a first pRRU. The method further includes: The BBU determines whether an air interface channel quality value between the first terminal device and the first pRRU is greater than a preset threshold; and if yes, the BBU uses the first pRRU as the target pRRU; or if no, when the first pRRU is a pRRU that is determined by the BBU and that is configured to send a downlink signal of a second terminal device to the second terminal device, the BBU uses the first pRRU as the target pRRU. In this possible implementation, a specific manner in which the BBU determines the target pRRU is provided, so that feasibility of the solution is improved.

In another possible implementation, the method further includes: The BBU sends first indication information to an RHUB. The first indication information is used to indicate the RHUB not to send the downlink signal of the first terminal device to a second pRRU within a first duration, and the second pRRU is a pRRU other than the target pRRU in pRRUs included in the cell in which the first terminal device is located. In this possible implementation, a manner in which the BBU controls that the downlink signal of the first terminal device is sent only by the target pRRU is provided. The first indication information is sent to the RHUB, and the RHUB does not send the downlink signal of the first terminal device to the second pRRU within the first duration, to implement the manner.

In another possible implementation, the first indication information is further used to indicate the RHUB to send the downlink signal of the first terminal device to the target pRRU within the first duration. In this possible implementation, the first indication information may also indicate the RHUB to send the downlink signal of the first terminal device to the target pRRU within the first duration.

In another possible implementation, the method further includes: The BBU sends second indication information to a second pRRU, and the second indication information is used to indicate the second pRRU not to send the downlink signal of the first terminal device to the first terminal device within a first duration, and the second pRRU is a pRRU other than the target pRRU in pRRUs included in the cell in which the first terminal device is located. In this possible implementation, another manner in which the BBU controls that the downlink signal of the first terminal device is sent only by the target pRRU is provided. The BBU sends the second indication information to the second pRRU. The second indication information is used to indicate the second pRRU not to send the downlink signal of the first terminal device to the first terminal device within the first duration.

In another possible implementation, the method further includes: The BBU sends third indication information to the target pRRU, where the third indication information is used to indicate the target pRRU to send the downlink signal of the first terminal device to the first terminal device within the first duration.

A second aspect of embodiments of this application provides a communication processing method. The method includes:

An RHUB receives first indication information sent by a BBU. Then the RHUB skips sending, based on the first indication information, a downlink signal of a first terminal device to a second pRRU within a first duration, and sends the downlink signal of the first terminal device to a target pRRU within the first duration. The second pRRU is a pRRU other than the target pRRU in pRRUs included in a cell in which the first terminal device is located. In this possible implementation, the RHUB skips sending, based on the first indication information, the downlink signal of the first terminal device to the second pRRU within the first duration. This means that only the target pRRU sends the downlink signal of the first terminal device to the first terminal device within the first duration. In this way, a path for sending the downlink signal of the first terminal device is reduced, so that a transmission latency is reduced, a probability of frequency selective fading of a signal is reduced, and downlink transmission performance is improved.

A third aspect of embodiments of this application provides a communication processing method. The method includes:

A second pRRU receives second indication information sent by a BBU. Then the second pRRU skips sending, based on the second indication information, a downlink signal of a first terminal device to the first terminal device within a first duration. In this possible implementation, the second pRRU skips sending, based on the second indication information, the downlink signal of the first terminal device to the first terminal device within the first duration. This means that only a target pRRU sends the downlink signal of the first terminal device to the first terminal device within the first duration. In this way, a path for sending the downlink signal of the first terminal device is reduced, so that a transmission latency is reduced, a probability of frequency selective fading of a signal is reduced, and downlink transmission performance is improved.

A fourth aspect of embodiments of this application provides an access network device. The access network device includes a BBU, and the BBU includes:

a transceiver module, configured to receive an uplink measurement signal sent by a first terminal device; and
a processing module, configured to generate an air interface measurement report based on the uplink measurement signal, where the air interface measurement report includes an air interface channel quality value between the first terminal device and at least one pRRU in a cell in which the first terminal device is located; and select a target pRRU from the at least one pRRU based on the air interface measurement report, where a quantity of target pRRUs is less than a quantity of the at least one pRRU, and the target pRRU is configured to send a downlink signal of the first terminal device to the first terminal device.

In a possible implementation, the at least one pRRU includes a first pRRU. The processing module is specifically configured to:
determine whether an air interface channel quality value between the first terminal device and the first pRRU is greater than a preset threshold; and
if yes, use the first pRRU as the target pRRU; or
if no, when the first pRRU is a pRRU that is determined by the BBU and that is configured to send a downlink signal of a second terminal device to the second terminal device, use the first pRRU as the target pRRU.

In another possible implementation, the transceiver module is further configured to:
send first indication information to an RHUB, where the first indication information is used to indicate the RHUB not to send the downlink signal of the first terminal device to a second pRRU within a first duration, and the second pRRU is a pRRU other than the target pRRU in pRRUs included in the cell in which the first terminal device is located.

In another possible implementation, the first indication information is further used to indicate the RHUB to send the downlink signal of the first terminal device to the target pRRU within the first duration.

In another possible implementation, the transceiver module is further configured to:
send second indication information to a second pRRU, where the second indication information is used to indicate the second pRRU not to send the downlink signal of the first terminal device to the first terminal device within a first duration, and the second pRRU is a pRRU other than the target pRRU in pRRUs included in the cell in which the first terminal device is located.

In another possible implementation, the transceiver module is further configured to:
send third indication information to the target pRRU, where the third indication information is used to indicate the target pRRU to send the downlink signal of the first terminal device to the first terminal device within the first duration.

A fifth aspect of embodiments of this application provides an RHUB. The RHUB includes:
a transceiver module, configured to receive first indication information sent by a BBU; and
a processing module, configured to skip sending, based on the first indication information, a downlink signal of a first terminal device to a second pRRU within a first duration, and send the downlink signal of the first terminal device to a target pRRU within the first duration, where the second pRRU is a pRRU other than the target pRRU in pRRUs included in a cell in which the first terminal device is located.

A sixth aspect of embodiments of this application provides a second pRRU. The second pRRU includes:
a transceiver module, configured to receive second indication information sent by a BBU; and
a processing module, configured to skip sending, based on the second indication information, a downlink signal of a first terminal device to the first terminal device within a first duration.

A seventh aspect of embodiments of this application provides an access network device. The access network device includes a BBU. The BBU includes a processor, a memory, an input/output device, and a bus. The memory stores computer instructions. When the processor executes the computer instructions in the memory, the processor is configured to implement any implementation of the first aspect.

In a possible implementation of the seventh aspect, the processor, the memory, and the input/output device are connected to the bus separately.

An eighth aspect of embodiments of this application provides an RHUB. The RHUB includes a processor, a memory, an input/output device, and a bus. The memory stores computer instructions. When the processor executes the computer instructions in the memory, the processor is configured to implement any implementation of the second aspect.

In a possible implementation of the eighth aspect, the processor, the memory, and the input/output device are connected to the bus separately.

A ninth aspect of embodiments of this application provides a second pRRU. The second pRRU includes a processor, a memory, an input/output device, and a bus. The memory stores computer instructions. When the processor executes the computer instructions in the memory, the processor is configured to implement any implementation of the third aspect.

In a possible implementation of the ninth aspect, the processor, the memory, and the input/output device are connected to the bus separately.

A tenth aspect of embodiments of this application provides a communication processing system. The communication processing system includes the BBU according to the first aspect, the RHUB according to the second aspect, and the second pRRU according to the third aspect.

An eleventh aspect of embodiments of this application provides a chip system. The chip system includes a processor and an input/output port. The processor is configured to implement the processing function in the communication processing method according to the first aspect. The input/output port is configured to implement the sending and receiving functions in the communication processing method according to the first aspect.

In a possible design, the chip system further includes a memory. The memory is configured to store program instructions and data that are used to implement the functions in the communication processing method according to the first aspect.

The chip system may include a chip, or may include a chip and another discrete component.

A twelfth aspect of embodiments of this application provides a chip system. The chip system includes a processor and an input/output port. The processor is configured to implement the processing function in the communication processing method according to the second aspect. The input/output port is configured to implement the sending and receiving functions in the communication processing method according to the second aspect.

In a possible design, the chip system further includes a memory. The memory is configured to store program instructions and data that are used to implement the functions in the communication processing method according to the second aspect.

The chip system may include a chip, or may include a chip and another discrete component.

A thirteenth aspect of embodiments of this application provides a chip system. The chip system includes a processor and an input/output port. The processor is configured to implement the processing function in the communication processing method according to the third aspect. The input/output port is configured to implement the sending and receiving functions in the communication processing method according to the third aspect.

In a possible design, the chip system further includes a memory. The memory is configured to store program instructions and data that are used to implement the functions in the communication processing method according to the third aspect.

The chip system may include a chip, or may include a chip and another discrete component.

A fourteenth aspect of embodiments of this application provides a computer-readable storage medium. The computer-readable storage medium stores computer instructions. When the computer instructions are run on a computer, the computer is enabled to perform the communication processing method in any possible implementation of the first aspect, the second aspect, or the third aspect.

A fifteenth aspect of embodiments of this application provides a computer program product. The computer program product includes a computer program or instructions. When the computer program or the instructions are run on a computer, the computer is enabled to perform the communication processing method in any possible implementation of the first aspect, the second aspect, or the third aspect.

It can be learned from the foregoing technical solutions that embodiments of this application have the following advantages:

It can be learned from the foregoing technical solutions that the BBU receives the uplink measurement signal sent by the first terminal device. Then the BBU generates the air interface measurement report based on the uplink measurement signal. The air interface measurement report includes the air interface channel quality value between the first terminal device and the at least one pRRU in the cell in which the first terminal device is located. Then the BBU selects the target pRRU from the at least one pRRU based on the air interface measurement report. The target pRRU is configured to send the downlink signal of the first terminal device to the first terminal device, and the quantity of the target pRRUs is less than the quantity of the at least one pRRU. Therefore, in the technical solutions in embodiments of this application, the BBU selects the target pRRU from the at least one pRRU based on the air interface measurement report to send the downlink signal to the first terminal device. Compared with the conventional technology, embodiments of this application reduce the path for sending the downlink signal of the first terminal device, so that the transmission latency is reduced, the probability of frequency selective fading of the signal is reduced, and the downlink transmission performance is improved.

DESCRIPTION OF EMBODIMENTS

Embodiments of this application provide a communication processing method, a BBU, an RHUB, and a second pRRU, which are used to reduce a probability of frequency selective fading of a signal and improve downlink transmission performance.

Figure 1A:
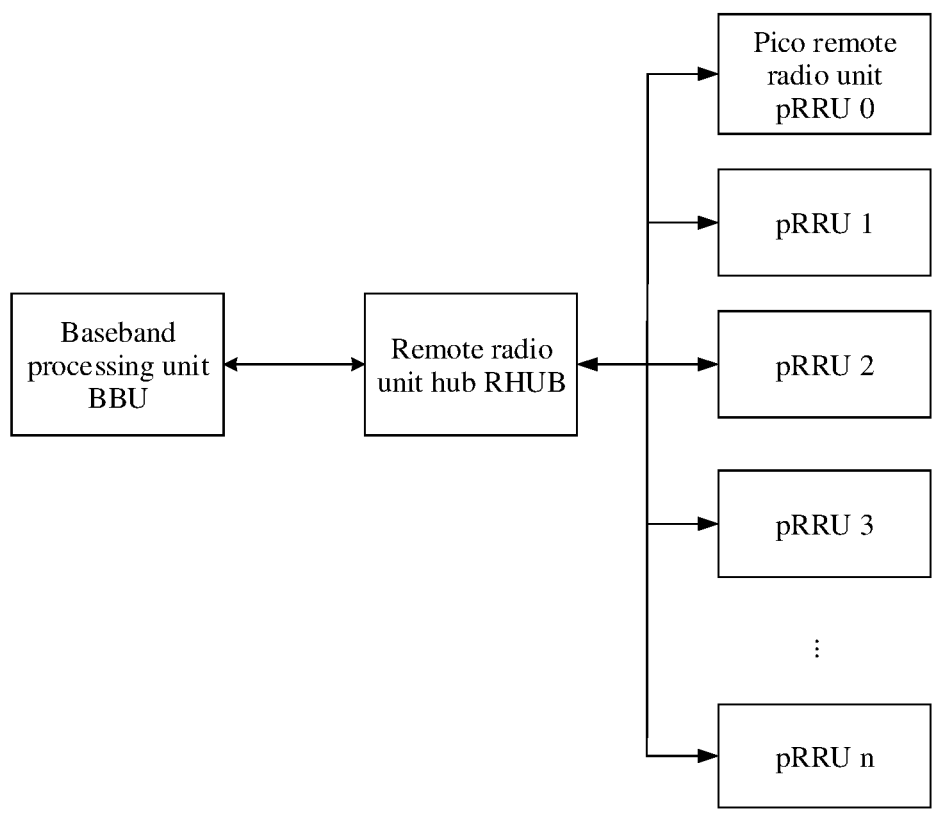
FIG. 1A is a schematic diagram of an architecture of a DIS according to an embodiment of this application.
Figure 1B:
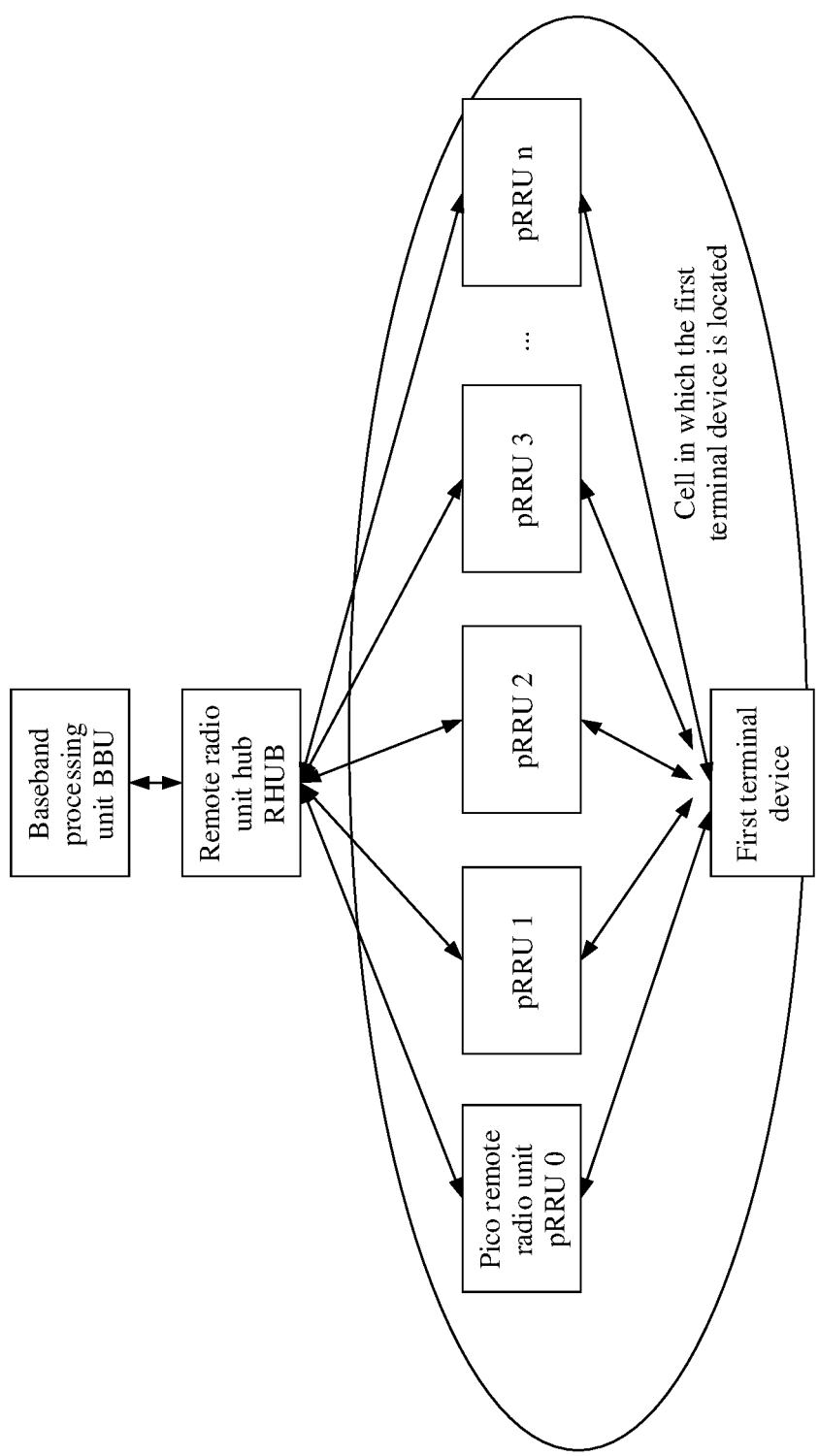
FIG. 1B is a schematic diagram of interaction in a three-level architecture in a DIS according to an embodiment of this application.

FIG. 1A is a schematic diagram of an architecture of a DIS according to an embodiment of this application. The DIS is an architecture divided into three levels: a BBU, an RHUB, and pRRUs. One BBU may be connected to one or more RHUBs (FIG. 1A only shows a scenario in which the BBU is connected to one RHUB), and one RHUB may be connected to a plurality of pRRUs. An operating principle of the DIS is described by using FIG. 1B below. As shown in FIG. 1B, the BBU sends downlink signals to the RHUB. The RHUB is connected to the pRRU through one network cable. The RHUB delivers the downlink signals to the pRRUs. The pRRUs process the downlink signals into radio frequency signals, and make the radio frequency signals access an indoor area through a transmission device such as a radio frequency feeder, a combiner/divider, or an antenna. An indoor terminal sends feedback signals to the pRRUs, and the pRRUs send the feedback signals to the RHUB. The RHUB converges the feedback signals, and then sends the feedback signals to the BBU.

However, in this system, the downlink signals that are transmitted by the plurality of pRRUs are the same. Because the pRRUs are installed at different positions, a latency occurs when the same downlink signals arrive at the terminal device through the different pRRUs. A larger latency indicates a smaller coherence bandwidth of the signals. When a signal bandwidth occupied by the terminal device is greater than the coherence bandwidth, frequency selective fading occurs. Consequently, signal distortion occurs in a frequency band occupied by the signals, downlink channel transmission quality is affected, and downlink transmission performance is reduced.

In view of this, embodiments of this application provide a communication processing method, which is used to reduce a probability of frequency selective fading of a signal and improve downlink transmission performance. The BBU receives an uplink measurement signal sent by a first terminal device, and generates an air interface measurement report based on the uplink measurement signal. The air interface measurement report includes an air interface channel quality value between the first terminal device and at least one pRRU in a cell in which the first terminal device is located. Then the BBU selects a target pRRU from the at least one pRRU based on the air interface measurement report. The target pRRU is configured to send a downlink signal to the first terminal device, and a quantity of target pRRUs is less than a quantity of the at least one pRRU. Therefore, in the technical solutions in embodiments of this application, the BBU selects the target pRRU from the at least one pRRU based on the air interface measurement report to send the downlink signal to the first terminal device. Compared with a conventional technology, embodiments of this application reduce a path for sending the downlink signal of the first terminal device, so that a transmission latency is reduced, a probability of frequency selective fading of a signal is reduced, and downlink transmission performance is improved.

It should be noted that, in embodiments of this application, the BBU may be a baseband processing unit in an access network device. The access network device may include an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (WIFI) system, a wireless relay node, a wireless backhaul node, a transmission point (TRP or TP), or the like. Alternatively, the access network device may be a gNB or a transmission point (TRP or TP) in a 5G system, such as an NR system, or one antenna panel or a group of antenna panels (including a plurality of antenna panels) of a base station in the 5G system, or may be a network node that constitutes the gNB or the transmission point, for example, a baseband unit (BBU) or a distributed unit (DU).

In some deployment, the gNB may include a centralized unit (CU) and the DU. The gNB may further include a radio unit (RU). The CU implements a part of functions of the gNB, and the DU implements a part of the functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling or PHCP layer signaling is sent by the DU or is sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein. An access network device in a wired communication system may include a passive optical network PON, a high-speed digital subscriber line (HDSL), an asymmetrical digital subscriber line (ADSL), an integrated digital subscriber loop with a V5 interface, and the like.

In embodiments of this application, an RHUB may be a device such as a switch or a router, and a pRRU may be an antenna device or the like. A terminal device is also referred to as user equipment (UE), a mobile station (MS), a mobile terminal (MT), or the like. The terminal device is a device having a wireless transceiver function, and is an entry for a moving user to interactive with a network. The terminal device can provide basic computing and storage capabilities, display a service window to a user, and receive an input operation of the user. In a 5G communication system, the terminal establishes a signal connection and a data connection to a RAN device by using a new radio technology, to transmit a control signal and service data to the network. The terminal device may be deployed on land, and includes an indoor device, an outdoor device, a handheld device, or a vehicle-mounted device; may be deployed on the water (for example, on a ship); or may be deployed in the air (for example, on an aircraft, a balloon, and a satellite). For example, the terminal device may include a mobile phone (or referred to as a "cellular" phone), a computer having a mobile terminal, a portable mobile apparatus, a pocket-sized mobile apparatus, a handheld mobile apparatus, a computer-built-in mobile apparatus, or an in-vehicle mobile apparatus, an intelligent wearable device, or the like. For example, the terminal device may be a device such as a personal communications service (PCS) phone, a cordless phone set, a session initiation protocol (SIP) phone, a wireless local loop (WLL) station, or a personal digital assistant (PDA).

In embodiments of this application, the BBU selects the target pRRU from the at least one pRRU based on the air interface measurement report, to send the downlink signal of the first terminal device to the first terminal device. There may be a plurality of specific implementations, and the implementations are described by using examples below.

Manner 1: After the BBU determines the target pRRU, the BBU sends first indication information to an RHUB. The first indication information is used to indicate the RHUB not to send the downlink signal of the first terminal device to a second pRRU within a first duration, and the second pRRU is a pRRU other than the target pRRU in pRRUs included in the cell in which the first terminal device is located. The manner is specifically described by using an embodiment shown in FIG. 2A.

Manner 2: After the BBU determines the target pRRU, the BBU sends second indication information to a second pRRU. The second indication information is used to indicate the second pRRU not to send the downlink signal of the first terminal device to the first terminal device within a first duration, and the second pRRU is a pRRU other than the target pRRU in pRRUs included in the cell in which the first terminal device is located. The manner is specifically described by using an embodiment shown in FIG. 3A.

Figure 2A:
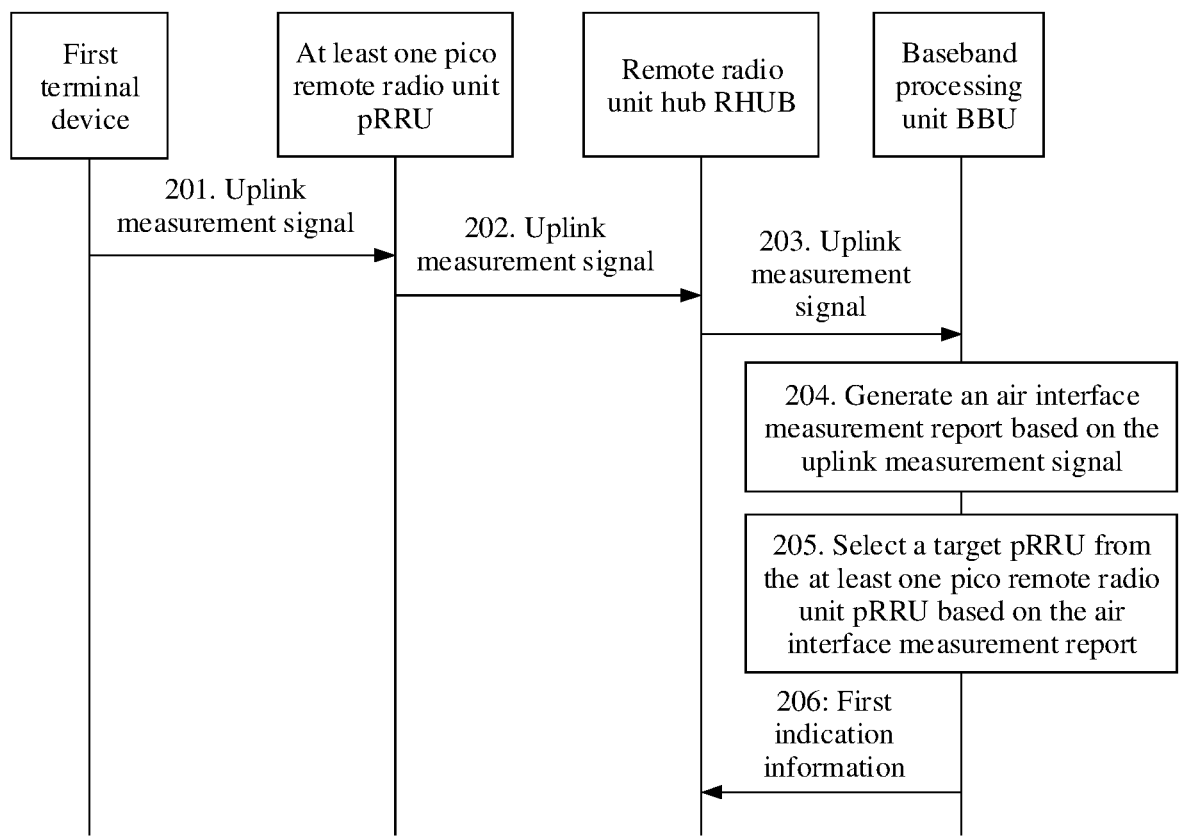
FIG. 2A is a schematic diagram of an embodiment of a communication processing method according to embodiments of this application.

FIG. 2A is a schematic diagram of an embodiment of a communication processing method according to embodiments of this application. The method includes the following steps.

201. At least one pRRU receives an uplink measurement signal sent by a first terminal device.

With reference to FIG. 1B, the first terminal device may send the uplink measurement signal based on a transmit power indicated by a BBU. In this case, at least one pRRU that is in a cell in which the first terminal device is located and that is close to the first terminal device may receive the uplink measurement signal. In other words, a pRRU that is in the cell in which the first terminal device is located and that can receive the uplink measurement signal belongs to the at least one pRRU.

The uplink measurement signal sent by the first terminal device is an analog electrical signal. It should be noted that the cell in which the first terminal device is located is a physical cell, for example, a baseband processing resource, and 20 M air interface bandwidth occupied by the physical cell. The physical cell may include a plurality of pRRUs, and the plurality of pRRUs are connected to the BBU by using one or more RHUBs.

202. The at least one pRRU sends the uplink measurement signal to the RHUB.

Because a form of the uplink measurement signal sent by the first terminal device is an analog electrical signal form, the at least one pRRU may convert the analog electrical signal into a digital electrical signal, and send the digital electrical signal to the RHUB.

203. The RHUB sends the uplink measurement signal to the BBU.

After receiving the digital electrical signal, the RHUB may forward the digital electrical signal to the BBU.

204. The BBU generates an air interface measurement report based on the uplink measurement signal.

The air interface measurement report includes an air interface channel quality value between the first terminal device and at least one pRRU in the cell in which the first terminal device is located.

Specifically, the BBU may determine, based on a power of the uplink measurement signal, the air interface channel quality value between the first terminal device and the at least one pRRU in the cell in which the first terminal device is located. The air interface channel quality value may be a signal-to-noise ratio.

205. The BBU selects a target pRRU from the at least one pRRU based on the air interface measurement report.

The target pRRU is configured to send a downlink signal of the first terminal device to the first terminal device, and a quantity of target pRRUs is less than a quantity of the at least one pRRU.

Figure 2B:
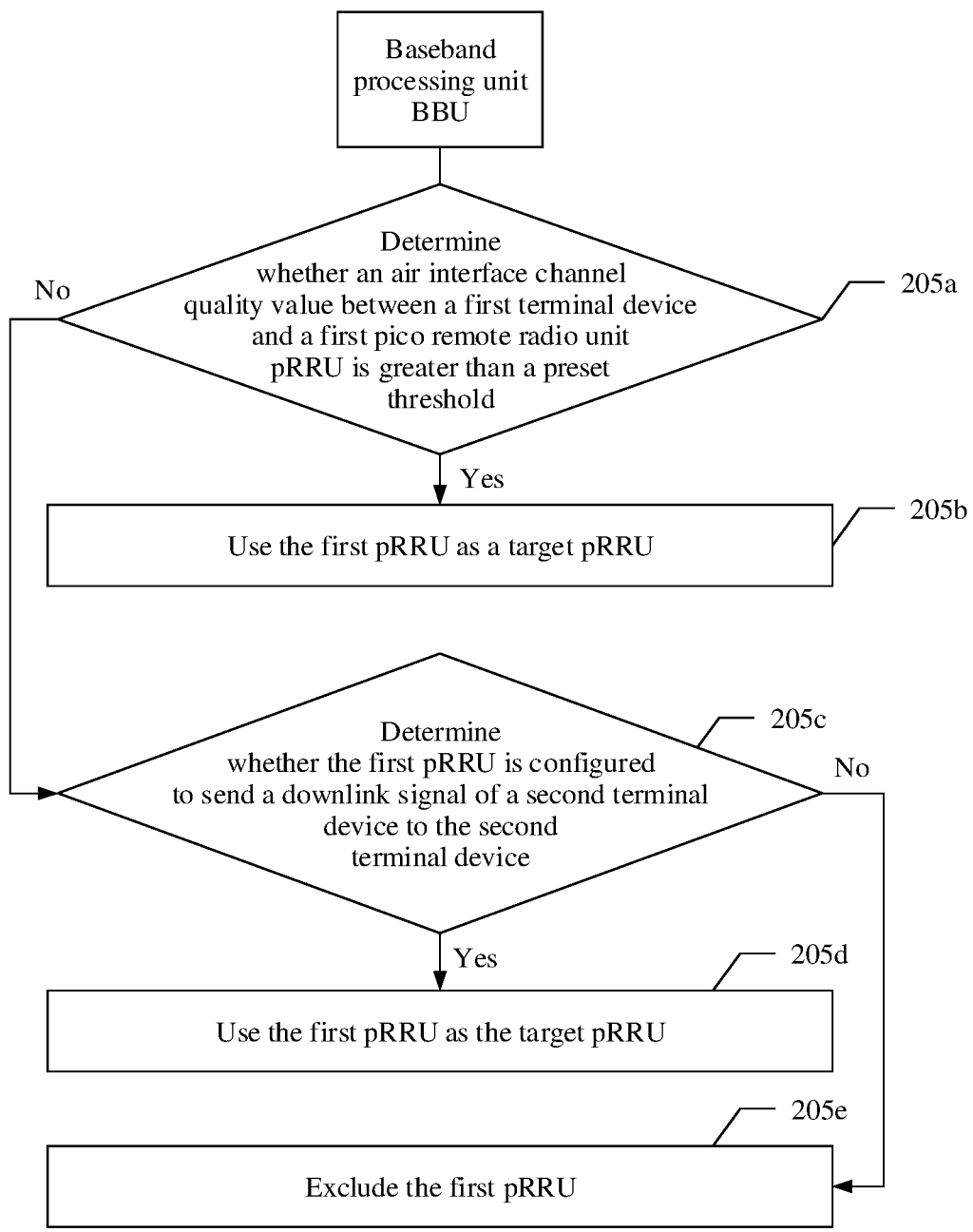
FIG. 2B is a schematic diagram of another embodiment of a communication processing method according to embodiments of this application.

The BBU may select the target pRRU based on the air interface channel quality value that is between the first terminal device and the at least one pRRU and that is carried in the air interface measurement report. For a specific implementation process, refer to FIG. 2B. FIG. 2B is a schematic diagram of another embodiment of embodiments of this application. The method includes the following steps.

205a: The BBU determines whether an air interface channel quality value between the first terminal device and a first pRRU is greater than a preset threshold. If yes, perform step 205b; or if no, perform step 205c.

205b: The BBU uses the first pRRU as the target pRRU.

205c: The BBU determines whether the first pRRU is configured to send a downlink signal of a second terminal device to the second terminal device. If yes, perform step 205d; or if no, perform step 205e.

When the air interface channel quality value between the first terminal device and the first pRRU is not greater than the preset threshold, the BBU determines whether the first pRRU is selected to send the downlink signal of the second terminal device to the second terminal device. If yes, perform step 205d; or if no, perform step 205e. The second terminal device is any terminal device in the cell, and the second terminal device may be close to the first pRRU, that is, air interface channel quality between the second terminal device and the first pRRU is good. In this case, the BBU may select the first pRRU to send the downlink signal of the second terminal device to the second terminal device.

205d: Use the first pRRU as the target pRRU.

If the first pRRU is configured to send the downlink signal of the second terminal device to the second terminal device, the first pRRU is used as the target pRRU.

205e. Exclude the first pRRU.

If no, exclude the first pRRU. That is, in this case, the target pRRU does not include the first pRRU.

206. The BBU sends first indication information to the RHUB.

The first indication information is used to indicate the RHUB not to send the downlink signal of the first terminal device to a second pRRU within a first duration, and the second pRRU is a pRRU other than the target pRRU in pRRUs included in the cell in which the first terminal device is located.

In this possible implementation, this means that the RHUB is indicated to send the downlink signal of the first terminal device to the target pRRU within the first duration. Alternatively, the first indication information may carry a corresponding indication field to indicate the RHUB to send the downlink signal of the first terminal device to the target pRRU within the first duration. The first duration may be set based on a movement status (which is learned from the air interface measurement report sent by the first terminal device) of the first terminal device. In addition, in this embodiment of this application, the solution of this embodiment of this application may be implemented within an interval duration. Actually, the interval duration may be set based on the movement status of the first terminal device.

Figure 2C:
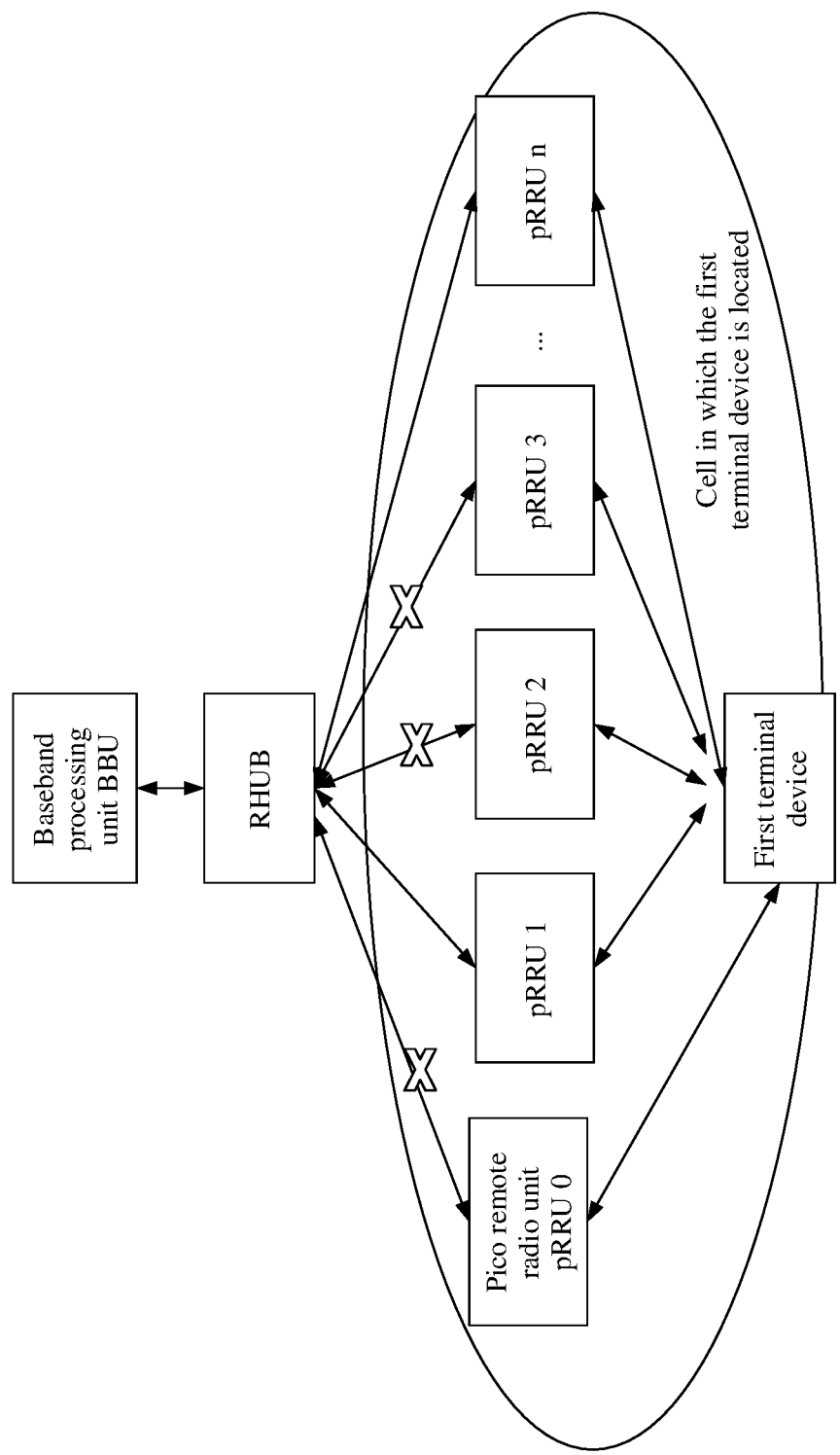
FIG. 2C is a schematic diagram of a scenario of a communication processing method according to an embodiment of this application.

For example, as shown in FIG. 2C, second pRRUs include a pRRU 0, a pRRU 2, and a pRRU 3. For example, the BBU indicates the RHUB not to send the downlink signal of the first terminal device to the pRRU 0, the pRRU 2, and the pRRU 3 within 10 ms, and the BBU sends the downlink signal of the first terminal device to the first terminal device on a pRRU 1, a pRRU 4, and a pRRU 5 to a pRRU n within the first duration. Specifically, as shown in FIG. 2C, no signal is sent on communication links that have cross signs between the RHUB and the pRRUs. Optionally, the BBU may also send operations corresponding to the following n 10 ms to the RHUB by using 10 ms as a time period. The following provides a description with reference to Table 1.

TABLE 1

| | Time/pRRU ID | | | | | | | |
|---|---|---|---|---|---|---|---|---|
| | 0 | 1 | 2 | 3 | 4 | 5 | ... | n |
| 10 ms (milliseconds) | 0 | 1 | 0 | 0 | 1 | 1 | 1 | 1 |
| 20 ms | 0 | 1 | 0 | 0 | 1 | 1 | 1 | 1 |
| 30 ms | 0 | 0 | 1 | 0 | 1 | 1 | 1 | 1 |
| 40 ms | 1 | 1 | 0 | 0 | 1 | 1 | 1 | 1 |

For example, as shown in Table 1, the BBU determines, based on the air interface measurement report of the first terminal device, use requirements of each pRRU in each time period shown in Table 1, where "0" indicates that transmit selection on a corresponding pRRU is disabled, and "1" indicates that the transmit selection on a corresponding pRRU is enabled. Specifically, duration shown in Table 1 may be determined with reference to an actual situation. For example, when a user moves slowly, the user may send the downlink signal of the first terminal device to the first terminal device in a short time by using a same pRRU.

In this embodiment of this application, the BBU receives the uplink measurement signal sent by the first terminal device. Then the BBU generates the air interface measurement report based on the uplink measurement signal. The air interface measurement report includes the air interface channel quality value between the first terminal device and the at least one pRRU in the cell in which the first terminal device is located. Then the BBU selects the target pRRU from the at least one pRRU based on the air interface measurement report. The target pRRU is configured to send the downlink signal to the first terminal device, and the quantity of target pRRUs is less than the quantity of the at least one pRRU. The BBU sends the first indication information to the second pRRU. The first indication information is used to indicate the RHUB not to send the downlink signal of the first terminal device to the second pRRU within the first duration. The second pRRU is the pRRU other than the target pRRU in the pRRUs included in the cell in which the first terminal device is located. This means that the RHUB is indicated to send the downlink signal of the first terminal device to the target pRRU within the first duration. Therefore, in the technical solution in this embodiment of this application, the BBU selects the target pRRU from the at least one pRRU based on the air interface measurement report to send the downlink signal to the first terminal device. Compared with a conventional technology, this embodiment of this application reduces a path for sending the downlink signal of the first terminal device, so that a transmission latency is reduced, a probability of frequency selective fading of a signal is reduced, and downlink transmission performance is improved.

Figure 3A:
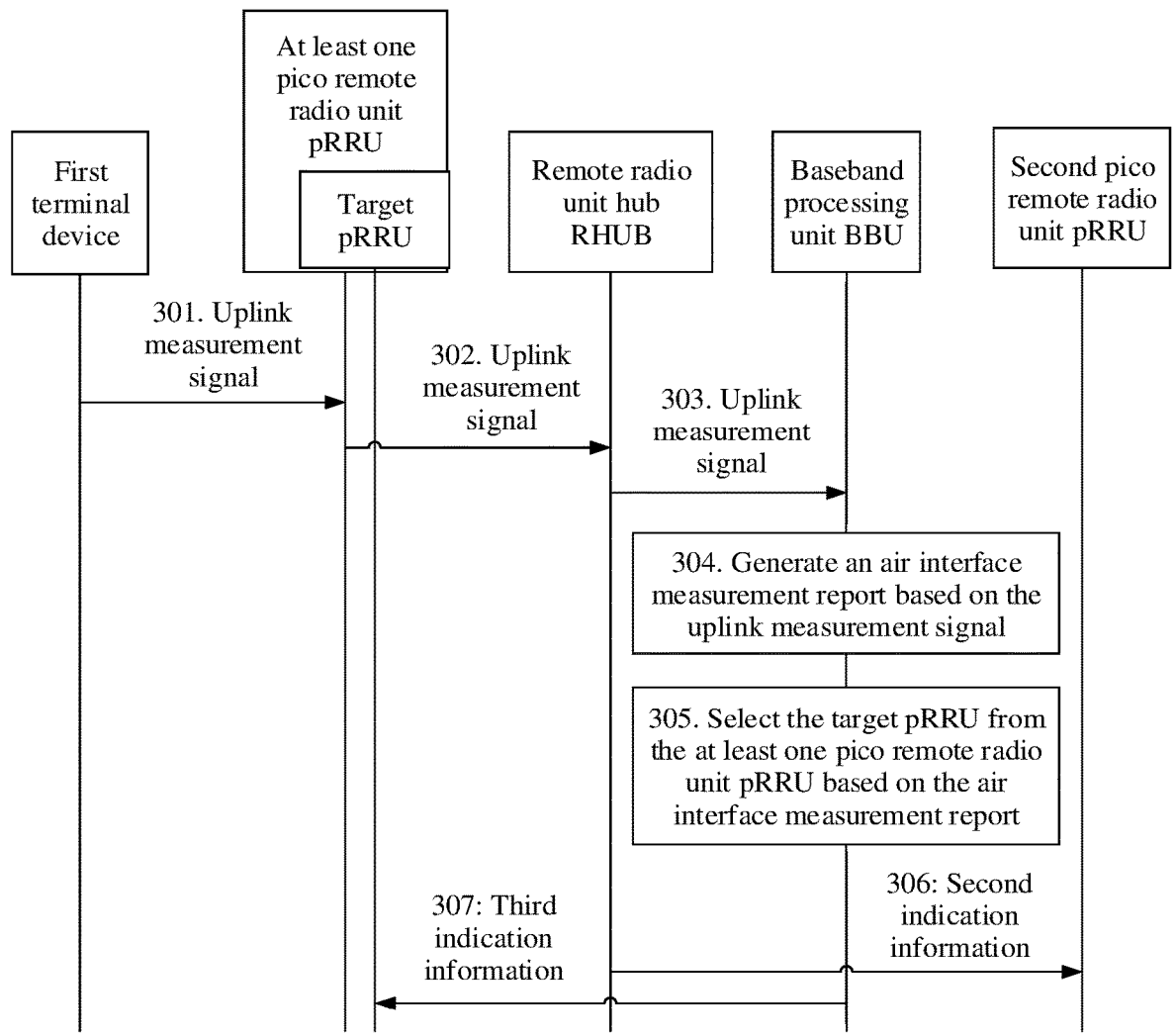
FIG. 3A is a schematic diagram of another embodiment of a communication processing method according to embodiments of this application.

FIG. 3A is a schematic diagram of another embodiment of a communication processing method according to embodiments of this application. The method includes the following steps.

301. At least one pRRU receives an uplink measurement signal sent by a first terminal device.

302. The at least one pRRU sends the uplink measurement signal to an RHUB.

303. The RHUB sends the uplink measurement signal to a BBU.

304. The BBU generates an air interface measurement report based on the uplink measurement signal.

305. The BBU selects a target pRRU from the at least one pRRU based on the air interface measurement report.

Step 301 to step 305 are similar to step 201 to step 205 in the embodiment shown in FIG. 2A. For details, refer to related descriptions in step 201 to step 205 in the embodiment shown in FIG. 2A. The details are not described herein again.

306. The BBU sends second indication information to a second pRRU.

The second indication information is used to indicate the second pRRU not to send a downlink signal of the first terminal device to the first terminal device within a first duration, and the second pRRU is a pRRU other than the target pRRU in pRRUs included in a cell in which the first terminal device is located. The first duration may be set based on a movement status (which is learned from the air interface measurement report sent by the first terminal device) of the first terminal device. In addition, in this embodiment, the solution of this embodiment of this application may be implemented within an interval duration. Actually, the interval duration may be set based on the movement status of the first terminal device.

The following provides a description with reference to Table 2. Table 2 shows signal processing indications received by a pRRU 0 within 20 ms. Details are as follows:

TABLE 2

| | Time interval TTI | | | | | | | | | | | | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 |
| Processing manner | 0 | 0 | 0 | 0 | 0 | 0 | 0 | 0 | 0 | 0 | 0 | 0 | 0 | 0 | 0 | 0 | 0 | 0 | 0 | 0 | 0 |

It can be learned from Table 2 that the pRRU 0 skips sending the downlink signal of the first terminal device to the first terminal device within 20 ms, and each TTI may be 1 ms.

Figure 3B:
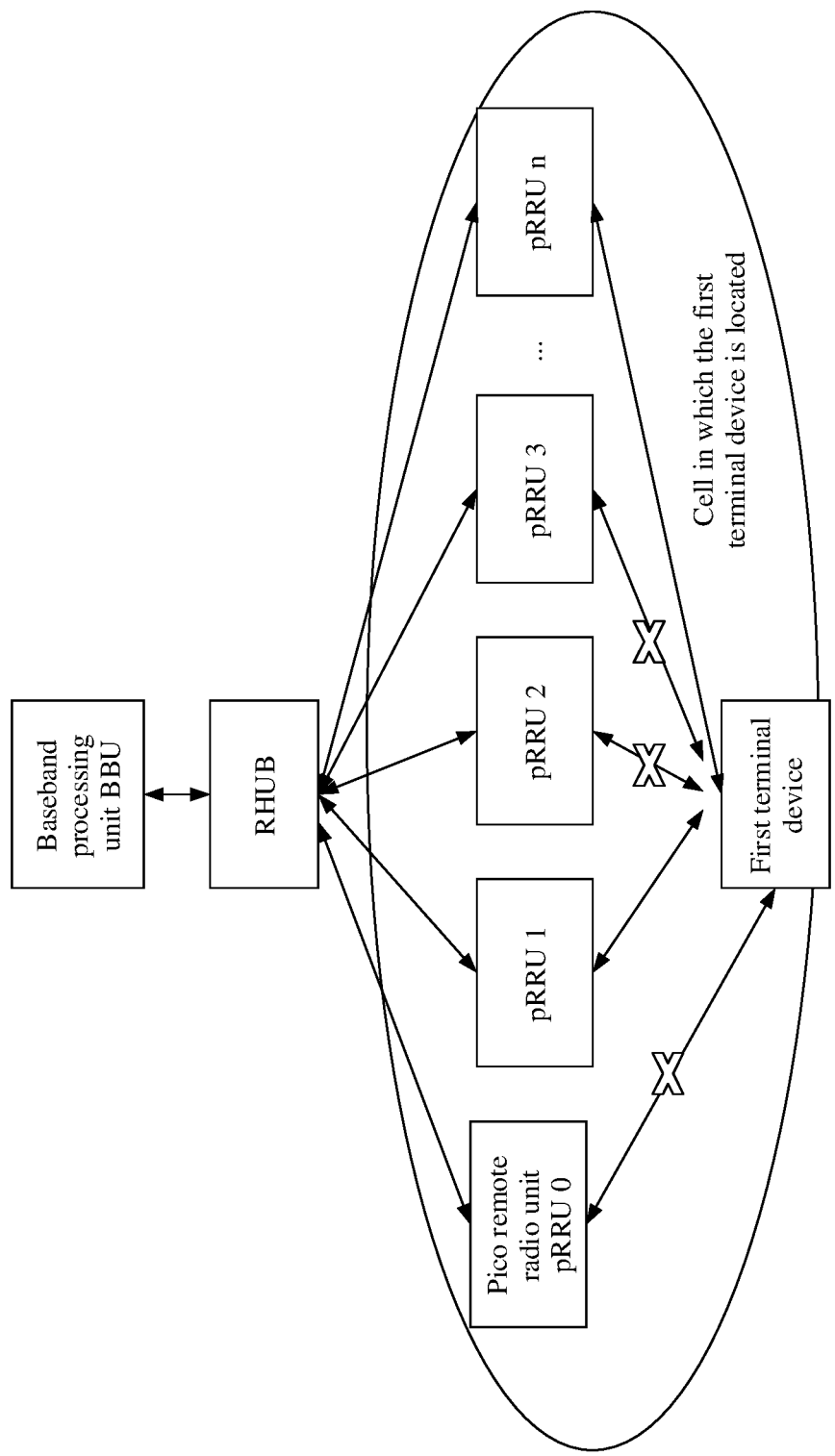
FIG. 3B is a schematic diagram of another scenario of a communication processing method according to an embodiment of this application.

Similarly, a pRRU 2 and a pRRU 3 also receive the indications shown in Table 2, and skip sending the downlink signal of the first terminal device within 20 ms. Specifically, with reference to FIG. 3B, no signal is sent on communication links that have cross signs between the pRRUs and the first terminal device.

307. The BBU sends third indication information to the target pRRU.

The third indication information is used to indicate the target pRRU to send the downlink signal of the first terminal device to the first terminal device within the first duration.

It should be noted that step 307 is optional. The target pRRU may alternatively need to send the downlink signal of the first terminal device within the first duration by default when no indication information sent by the BBU is received. Alternatively, the target pRRU may determine, based on indication information of the BBU, to send the downlink signal of the first terminal device within the first duration. Specifically, corresponding processing logic may be set based on an actual situation. This is not limited in this application. For example, the BBU may send Table 3 to a pRRU 1. Table 3 is specifically as follows:

TABLE 3

| | Time interval TTI | | | | | | | | | | | | | | | | | | | | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 |
| Processing manner | 1 | 1 | 1 | 1 | 1 | 1 | 1 | 1 | 1 | 1 | 1 | 1 | 1 | 1 | 1 | 1 | 1 | 1 | 1 | 1 | 1 |

It can be learned from Table 3 that the pRRU 1 sends the downlink signal of the first terminal device to the first terminal device within 20 ms.

Figure 3C:
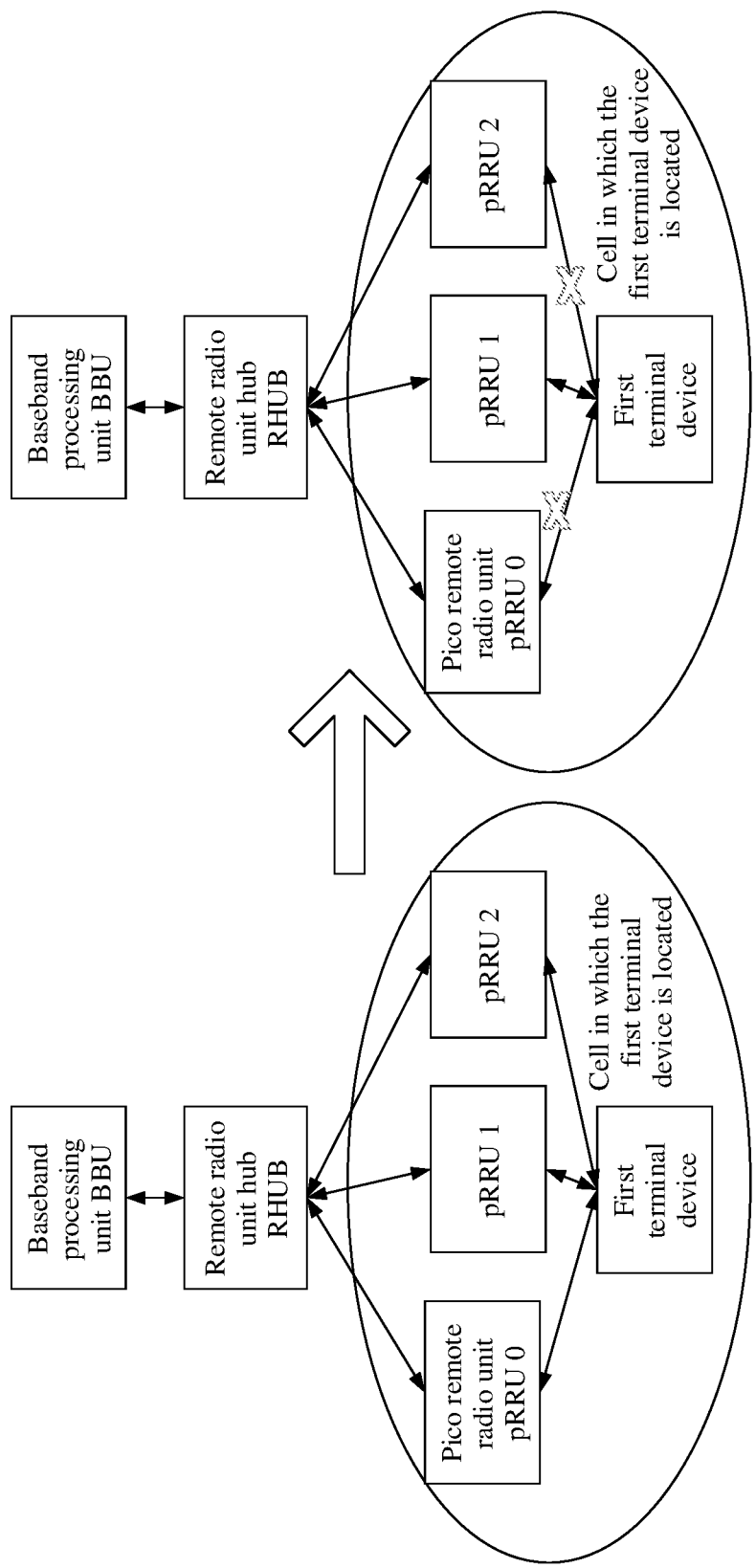
FIG. 3C is a schematic diagram of another scenario of a communication processing method according to an embodiment of this application.

With reference to a specific example in FIG. 3C, the following describes the method in this embodiment of this application. When the first terminal device performs a downlink transmission through radio frequency combination of three pRRUs, a downlink peak rate of the first terminal device reaches 1.08 Gbps to 1.18 Gbps. After the pRRU 0 and the pRRU 2 are blocked, a peak rate of the first terminal device may reach 1.48 Gbps to 1.56 Gbps in a same environment, and downlink performance is improved by at least 30%.

In this embodiment, the BBU receives the uplink measurement signal sent by the first terminal device. Then the BBU generates the air interface measurement report based on the uplink measurement signal. The air interface measurement report includes an air interface channel quality value between the first terminal device and at least one pRRU in the cell in which the first terminal device is located. Then the BBU selects the target pRRU from the at least one pRRU based on the air interface measurement report. The target pRRU is configured to send the downlink signal to the first terminal device, and a quantity of target pRRUs is less than a quantity of the at least one pRRU. The BBU sends the second indication information to the second pRRU. The second indication information is used to indicate the second pRRU not to send the downlink signal of the first terminal device to the first terminal device within the first duration. The second pRRU is the pRRU other than the target pRRU in the pRRUs included in the cell in which the first terminal device is located. Therefore, in the technical solution in this embodiment of this application, the BBU selects the target pRRU from the at least one pRRU based on the air interface measurement report to send the downlink signal to the first terminal device. Compared with a conventional technology, this embodiment of this application reduces a path for sending the downlink signal of the first terminal device, so that a transmission latency is reduced, a probability of frequency selective fading of a signal is reduced, and downlink transmission performance is improved.

Figure 4:
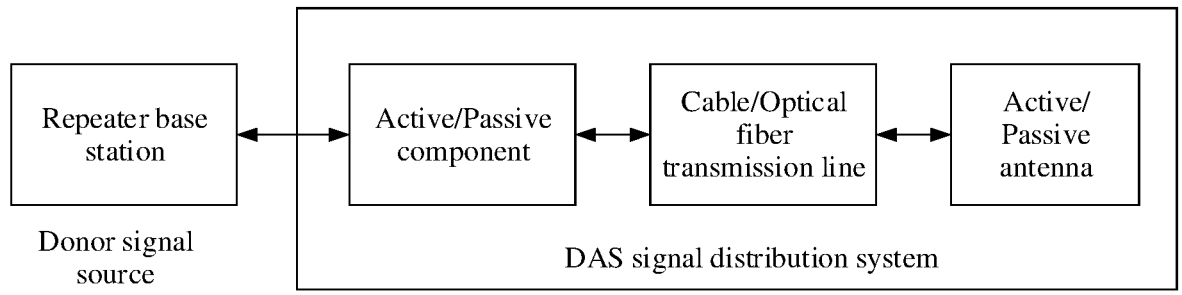
FIG. 4 is a schematic diagram of an architecture of a DAS according to an embodiment of this application.

The following describes a similar problem in a DAS. FIG. 4 is a schematic diagram of an architecture of a DAS according to an embodiment. A donor signal source of the DAS may be a macro base station, a microcell, a distributed base station, or various relay access repeaters. Generally, a signal output to the DAS signal distributed system is an analog radio frequency signal. A passive or active DAS component performs signal split transmission, and signals are evenly allocated through a feeder as much as possible to each antenna dispersedly installed in each area, to implement even distribution of indoor signals. Therefore, the DAS also has the similar technical problem. A control module for a downlink signal path may be added between a cable/optical fiber transmission line and an active/passive antenna, and then the donor signal source (for example, a base station or a microcell) controls the control module by using the method in embodiments of this application. In this way, a path for sending a downlink signal of a first terminal device is reduced in the DAS, so that a transmission latency is reduced, a probability of frequency selective fading of a signal is reduced, and downlink transmission performance is improved.

It should be noted that, in the foregoing method embodiments, only the target pRRU is selected to send the downlink signal of the first terminal device, to reduce a path for sending the downlink signal of the first terminal device in a DIS or the DAS, to improve the downlink transmission performance. In an actual application, this may also be implemented by reducing or increasing a downlink transmit power between the first terminal device and the pRRU, which belongs to a similar idea to a manner of enabling the pRRU or disabling the pRRU in the foregoing method embodiment. In other words, a solution of controlling the downlink transmit power between the first terminal device and the pRRU also falls within the protection scope of embodiments of this application.

Figure 5:
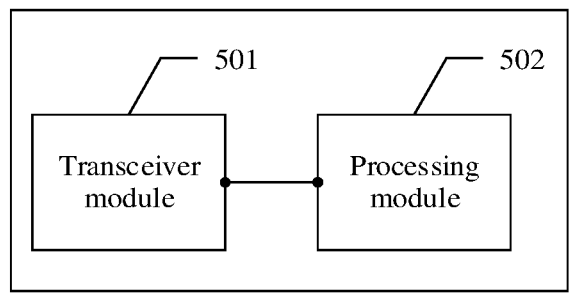
FIG. 5 is a schematic diagram of a structure of an access network device according to an embodiment of this application.

The following describes an access network device according to embodiments of this application. FIG. 5 is an embodiment of the access network device according to embodiments of this application. The access network device includes a BBU. The BBU may be configured to perform the steps performed by the BBU in the foregoing method embodiment. Refer to related descriptions in the foregoing method embodiments.

The BBU includes a transceiver module 501 and a processing module 502.

The transceiver module 501 is configured to receive an uplink measurement signal sent by a first terminal device; and the processing module 502 is configured to generate an air interface measurement report based on the uplink measurement signal, where the air interface measurement report includes an air interface channel quality value between the first terminal device and at least one pRRU in a cell in which the first terminal device is located; and select a target pRRU from the at least one pRRU based on the air interface measurement report, where a quantity of target pRRUs is less than a quantity of the at least one pRRU, and the target pRRU is configured to send a downlink signal of the first terminal device to the first terminal device.

In a possible implementation, the at least one pRRU includes a first pRRU. The processing module 502 is specifically configured to:

determine whether an air interface channel quality value between the first terminal device and the first pRRU is greater than a preset threshold; and if yes, use the first pRRU as the target pRRU; or if no, when the first pRRU is a pRRU that is determined by the BBU and that is configured to send a downlink signal of a second terminal device to the second terminal device, use the first pRRU as the target pRRU.

In another possible implementation, the transceiver module 501 is further configured to:

send first indication information to an RHUB, where the first indication information is used to indicate the RHUB not to send the downlink signal of the first terminal device to a second pRRU within a first duration, and the second pRRU is a pRRU other than the target pRRU in pRRUs included in the cell in which the first terminal device is located.

In another possible implementation, the first indication information is further used to indicate the RHUB to send the downlink signal of the first terminal device to the target pRRU within the first duration.

In another possible implementation, the transceiver module 501 is further configured to:

send second indication information to a second pRRU, where the second indication information is used to indicate the second pRRU not to send the downlink signal of the first terminal device to the first terminal device within a first duration, and the second pRRU is a pRRU other than the target pRRU in pRRUs included in the cell in which the first terminal device is located.

In another possible implementation, the transceiver module 501 is further configured to:

send third indication information to the target pRRU, where the third indication information is used to indicate the target pRRU to send the downlink signal of the first terminal device to the first terminal device within the first duration.

In this embodiment of this application, the transceiver module 501 receives the uplink measurement report sent by the first terminal device. The processing module 502 is configured to generate the air interface measurement report based on the uplink measurement report. The air interface measurement report includes the air interface channel quality value between the first terminal device and the at least one pRRU in the cell in which the first terminal device is located. Then the processing module 502 selects the target pRRU from the at least one pRRU based on the air interface measurement report. The target pRRU is configured to send the downlink signal of the first terminal device to the first terminal device, and the quantity of the target pRRUs is less than the quantity of the at least one pRRU. Therefore, in the technical solution in this embodiment of this application, the BBU selects the target pRRU from the at least one pRRU based on the air interface measurement report to send the downlink signal to the first terminal device. Compared with a conventional technology, this embodiment of this application reduces a path for sending the downlink signal of the first terminal device, so that a transmission latency is reduced, a probability of frequency selective fading of a signal is reduced, and downlink transmission performance is improved.

Figure 6:
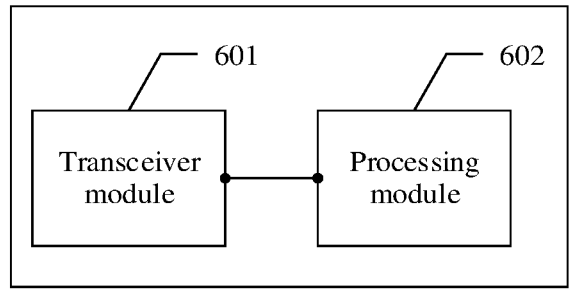
FIG. 6 is a schematic diagram of a structure of an RHUB according to an embodiment of this application.

The following describes an RHUB according to embodiments of this application. FIG. 6 is an embodiment of the RHUB according to embodiments of this application. The RHUB may be configured to perform the steps performed by the RHUB in the foregoing method embodiment. Refer to related descriptions in the foregoing method embodiment.

The RHUB includes a transceiver module 601 and a processing module 602.

The transceiver module 601 is configured to receive first indication information sent by a BBU; and the processing module 602 is configured to skip sending, based on the first indication information, a downlink signal of a first terminal device to a second pRRU within a first duration, and send the downlink signal of the first terminal device to a target pRRU within the first duration. The second pRRU is a pRRU other than the target pRRU in pRRUs included in a cell in which the first terminal device is located.

Figure 7:
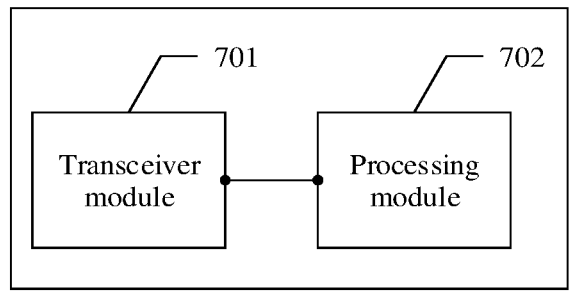
FIG. 7 is a schematic diagram of a structure of a second pRRU according to an embodiment of this application.

The following describes a second pRRU according to embodiments of this application. FIG. 7 is an embodiment of the second pRRU according to embodiments of this application. The second pRRU may be configured to perform the steps performed by the second pRRU in the foregoing method embodiment. Refer to related descriptions in the foregoing method embodiment.

The second pRRU includes a transceiver module 701 and a processing module 702.

The transceiver module 701 is configured to receive second indication information sent by a BBU; and the processing module 702 is configured to skip sending, based on the second indication information, a downlink signal of a first terminal device to the first terminal device within a first duration.

Figure 8:
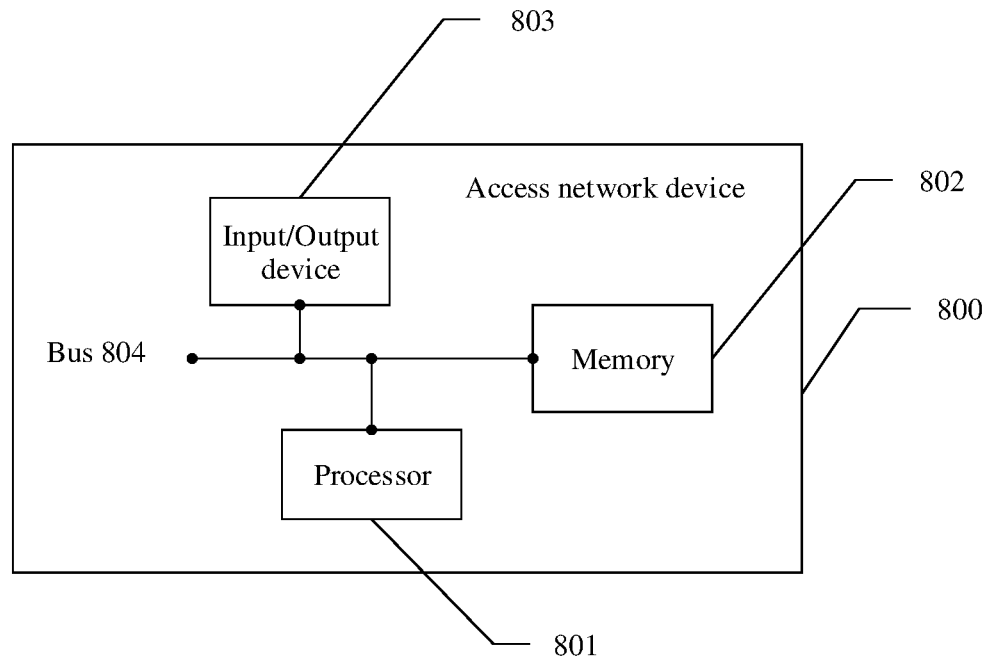
FIG. 8 is a schematic diagram of another structure of an access network device according to an embodiment of this application.

This application further provides an access network device 800. FIG. 8 is an embodiment of the access network device according to embodiments of this application. The access network device includes a BBU. The BBU may be configured to perform the steps performed by the BBU in the foregoing method embodiment. Refer to related descriptions in the foregoing method embodiment.

The access network device 800 includes a processor 801, a memory 802, an input/output device 803, and a bus 804.

In a possible implementation, the processor 801, the memory 802, and the input/output device 803 are connected to the bus 804 separately, and the memory stores computer instructions.

The processing module 502 in the foregoing embodiment shown in FIG. 5 may be the processor 801 in this embodiment. Therefore, a specific implementation of the processor 801 is not described again. The transceiver module 501 in the foregoing embodiment shown in FIG. 5 may be the input/output device 803 in this embodiment. Therefore, a specific implementation of the input/output device 803 is not described again.

Figure 9:
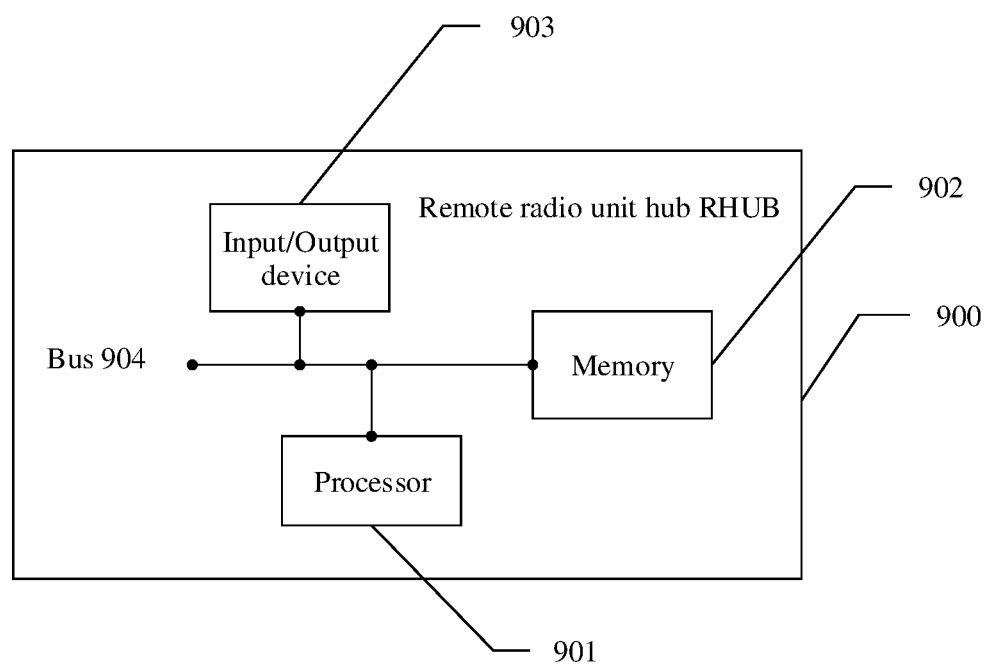
FIG. 9 is a schematic diagram of another structure of an RHUB according to an embodiment of this application.

This application further provides an RHUB 900. FIG. 9 is an embodiment of the RHUB according to embodiments of this application. The RHUB may be configured to perform the steps performed by the RHUB in the foregoing method embodiment. Refer to related descriptions in the foregoing method embodiment.

The RHUB 900 includes a processor 901, a memory 902, an input/output device 903, and a bus 904.

In a possible implementation, the processor 901, the memory 902, and the input/output device 903 are connected to the bus 904 separately, and the memory stores computer instructions.

The processing module 602 in the foregoing embodiment shown in FIG. 6 may be the processor 901 in this embodiment. Therefore, a specific implementation of the processor 901 is not described again. The transceiver module 601 in the foregoing embodiment shown in FIG. 6 may be the input/output device 903 in this embodiment. Therefore, a specific implementation of the input/output device 903 is not described again.

Figure 10:
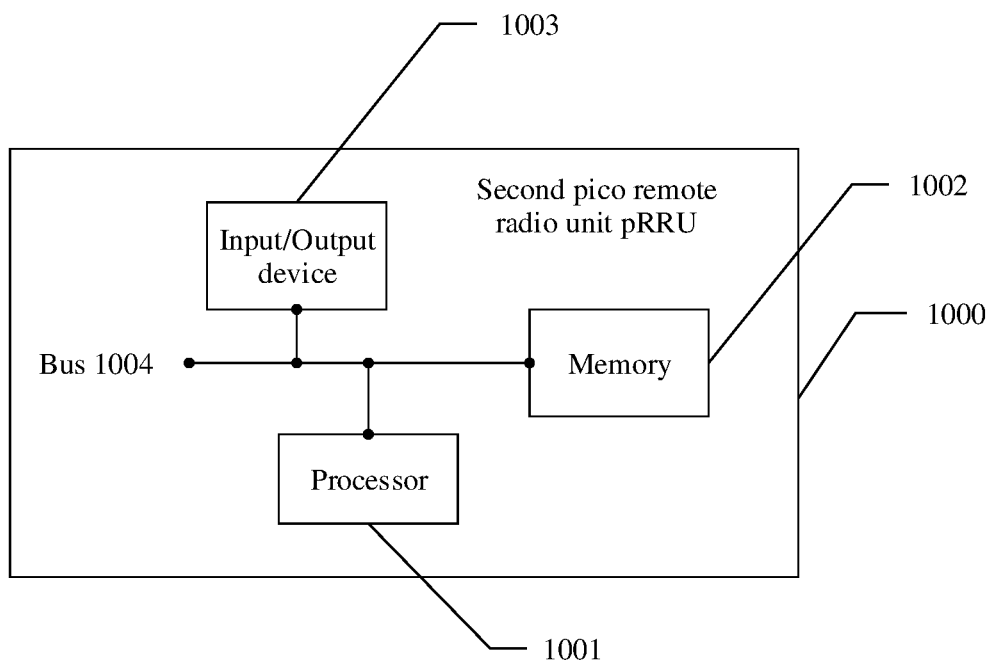
FIG. 10 is a schematic diagram of another structure of a second pRRU according to an embodiment of this application.

This application further provides a second pRRU 1000. FIG. 10 is an embodiment of the second pRRU according to embodiments of this application. The second pRRU may be configured to perform the steps performed by the second pRRU in the foregoing method embodiment. Refer to related descriptions in the foregoing method embodiment.

The second pRRU 1000 includes a processor 1001, a memory 1002, an input/output device 1003, and a bus 1004.

In a possible implementation, the processor 1001, the memory 1002, and the input/output device 1003 are connected to the bus 1004 separately, and the memory stores computer instructions.

The processing module 702 in the foregoing embodiment shown in FIG. 7 may be the processor 1001 in this embodiment. Therefore, a specific implementation of the processor 1001 is not described again. The transceiver module 701 in the foregoing embodiment shown in FIG. 7 may be the input/output device 1003 in this embodiment. Therefore, a specific implementation of the input/output device 1003 is not described again.

Figure 11:
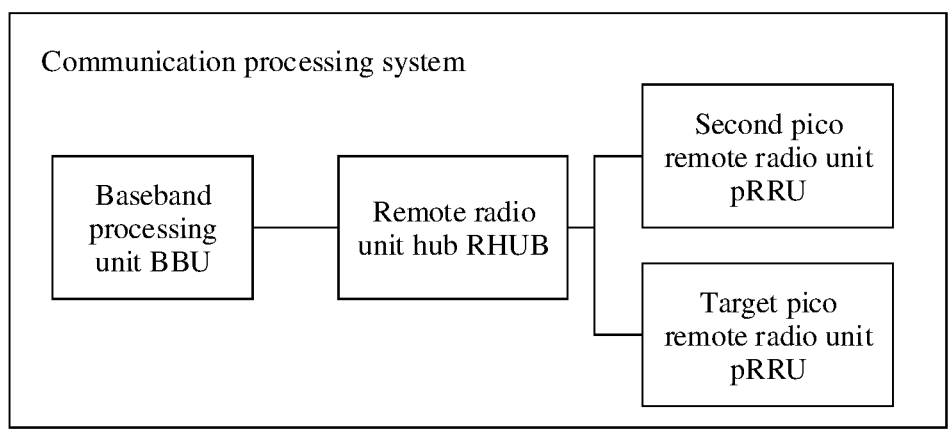
FIG. 11 is a schematic diagram of a communication processing system according to an embodiment of this application.

As shown in FIG. 11, an embodiment of this application further provides a communication processing system. The communication processing system may include a BBU, an RHUB, a second pRRU, and a target pRRU. The BBU may be configured to perform all or some of the steps performed by the BBU in embodiments shown in FIG. 2A, FIG. 2B, and FIG. 3A. The RHUB is configured to perform all or some of the steps performed by the RHUB in embodiments shown in FIG. 2A and FIG. 3A. The second pRRU is configured to perform all or some of the steps performed by the second pRRU in embodiments shown in FIG. 2A and FIG. 3A. The target pRRU is configured to perform all or some of the steps performed by the target pRRU in the embodiment shown in FIG. 3A.

An embodiment of this application provides a chip system. The chip system includes a processor and an input/output port. The processor is configured to implement the processing function in embodiments shown in FIG. 2A, FIG. 2B, and FIG. 3A. The input/output port is configured to implement the sending and receiving functions in embodiments shown in the FIG. 2A, FIG. 2B, and FIG. 3A.

In a possible design, the chip system further includes a memory. The memory is configured to store program instructions and data that are used to implement the functions in embodiments shown in the FIG. 2A, FIG. 2B, and FIG. 3A.

The chip system may include a chip, or may include a chip and another discrete component.

According to the methods provided in embodiments of this application, this application further provides a computer program product. The computer program product includes computer program code. When the computer program code is run on a computer, the computer is enabled to perform the methods in embodiments shown in FIG. 2A, FIG. 2B, and FIG. 3A.

According to the methods provided in embodiments of this application, this application further provides a computer-readable medium. The computer-readable medium stores program code. When the program code is run on a computer, the computer is enabled to perform the methods in embodiments shown in FIG. 2A, FIG. 2B, and FIG. 3A.

It may be clearly understood by persons skilled in the art that, for the purpose of convenient and brief description, for a detailed working process of the system, the apparatus, and the unit, refer to a corresponding process in the foregoing method embodiment, and details are not described herein again.

In the several embodiments provided in this application, it should be understood that the disclosed system, the apparatus, and the method may be implemented in other manners. For example, the foregoing apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (ROM), a random access memory (RAM), a magnetic disk, or a compact disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof. Such modifications or replacements do not make the essence of the corresponding technical solutions depart from the spirit and the scope of the technical solutions of embodiments of this application.

What is claimed is:

1. A communication processing method, comprising:
   receiving, by a baseband processing unit (BBU), an uplink measurement signal sent by a first terminal device;
   generating, by the BBU, an air interface measurement report based on the uplink measurement signal, wherein the air interface measurement report comprises an air interface channel quality value between the first terminal device and at least one pico remote radio unit (pRRU) in a cell in which the first terminal device is located; and
   selecting, by the BBU, a target pRRU from the at least one pRRU based on the air interface measurement report, wherein a quantity of target pRRUs is less than a quantity of the at least one pRRU, and the target pRRU is configured to send a downlink signal of the first terminal device to the first terminal device,
   wherein the at least one pRRU comprises a first pRRU, and the selecting, by the BBU, a target pRRU from the at least one pRRU based on the air interface measurement report comprises:
   determining a first duration during which only the target pRRU sends the downlink signal of the first terminal device to the first terminal device;
   determining, by the BBU, whether an air interface channel quality value between the first terminal device and the first pRRU is greater than a preset threshold;
   in response to determination that the air interface channel quality value between the first terminal device and the first pRRU is greater than the preset threshold, using, by the BBU, the first pRRU as the target pRRU within the first duration; and
   in response to determination that the air interface channel quality value between the first terminal device and the first pRRU is not greater than the preset threshold, using, by the BBU, the first pRRU as the target pRRU within the first duration when the first pRRU is configured to send a downlink signal of a second terminal device to the second terminal device,
   sending, by the BBU, first indication information to a remote radio unit hub (RHUB), wherein the first indication information indicates the RHUB not to send the downlink signal of the first terminal device to a second pRRU within the first duration, and the second pRRU is a pRRU other than the target pRRU in pRRUs comprised in the cell in which the first terminal device is located.

2. The method according to claim 1, wherein the first indication information further indicates the RHUB to send the downlink signal of the first terminal device to the target pRRU within the first duration.

3. The method according to claim 1, further comprising:
   sending, by the BBU, second indication information to the second pRRU, wherein the second indication information indicates the second pRRU not to send the downlink signal of the first terminal device to the first terminal device within the first duration, and the second pRRU is a pRRU other than the target pRRU in pRRUs comprised in the cell in which the first terminal device is located.

4. The method according to claim 3, further comprising:
   sending, by the BBU, third indication information to the target pRRU, wherein the third indication information indicates the target pRRU to send the downlink signal of the first terminal device to the first terminal device within the first duration.

5. The communication processing method according to claim 1, wherein the first duration is determined based on a movement status included in the air interface measurement report sent from the first terminal device.

6. The communication processing method according to claim 1, wherein the first duration is determined based on a speed of the first terminal device.

7. A communication processing method, comprising:
   receiving, by a remote radio unit hub (RHUB), first indication information sent by a baseband processing unit (BBU), wherein the first indication information indicates the RHUB not to send a downlink signal of a first terminal device to a second pico remote radio unit (pRRU) within a first duration during which only a target pRRU sends a downlink signal of the first terminal device to the first terminal device, and the second pRRU is a pRRU other than a target pRRU in pRRUs comprised in a cell in which the first terminal device is located; and
   skipping sending, by the RHUB based on the first indication information, the downlink signal of the first terminal device to the pRRU within the first duration, and sending the downlink signal of the first terminal device the target pRRU within the first duration, wherein the first duration is determined based on a movement status of the first terminal device.

8. An access network device, comprising a baseband processing unit (BBU) including a transceiver and a processor, wherein
   the transceiver is configured to receive an uplink measurement signal sent by a first terminal device; and
   the processor is configured to generate an air interface measurement report based on the uplink measurement signal, wherein the air interface measurement report comprises an air interface channel quality value between the first terminal device and at least one pico remote radio unit (pRRU) in a cell in which the first terminal device is located; and select a target pRRU from the at least one pRRU based on the air interface measurement report, wherein a quantity of target pRRUs is less than a quantity of the at least one pRRU, and the target pRRU is configured to send a downlink signal of the first terminal device to the first terminal device;

wherein the at least one pRRU comprises a first pRRU, and the processor is further configured to:

determine a first duration during which only the target pRRU sends the downlink signal of the first terminal device to the first terminal device;

determine whether an air interface channel quality value between the first terminal device and the first pRRU is greater than a preset threshold;

in response to determination that the air interface channel quality value between the first terminal device and the first pRRU is greater than the preset threshold, use the first pRRU as the target pRRU within the first duration;

in response to determination that the air interface channel quality value between the first terminal device and the first pRRU is not greater than the preset threshold, use the first pRRU as the target pRRU within the first duration when the first pRRU is configured to send a downlink signal of a second terminal device to the second terminal device; and send first indication information to a remote radio unit hub (RHUB), wherein the first indication information indicates the RHUB not to send the downlink signal of the first terminal device to a second pRRU within the first duration, and the second pRRU is a pRRU other than the target pRRU in pRRUs comprised in the cell in which the first terminal device is located.

9. The access network device according to claim 8, wherein the first indication information further indicates the RHUB to send the downlink signal of the first terminal device to the target pRRU within the first duration.

10. The access network device according to claim 8, wherein the transceiver is further configured to:

send second indication information to the second pRRU, wherein the second indication information indicates the second pRRU not to send the downlink signal of the first terminal device to the first terminal device within the first duration, and the second pRRU is a pRRU other than the target pRRU in pRRUs comprised in the cell in which the first terminal device is located.

11. The access network device according to claim 10, wherein the transceiver is further configured to:

send third indication information to the target pRRU, wherein the third indication information indicates the target pRRU to send the downlink signal of the first terminal device to the first terminal device within the first duration.

12. A remote radio hub (RHUB), comprising:

a transceiver, configured to receive first indication information sent by a baseband processing unit (BBU), wherein the first indication information indicates the RHUB not to send a downlink signal of a first terminal device to a second pico remote radio unit (pRRU) within a first duration during which only a target pRRU sends a downlink signal of the first terminal device to the first terminal device, and the second pRRU is a pRRU other than a target pRRU in pRRUs comprised in a cell in which the first terminal device is located; and a processor, configured to skip sending, based on the first indication information, the downlink signal of the first terminal device to a pRRU within the first duration, and send the downlink signal of the first terminal device to the target pRRU within the first duration, wherein the first duration is determined based on a movement status of the first terminal device.

\* \* \* \* \*